(12) United States Patent
Smaragdis et al.

(10) Patent No.: US 7,218,755 B2
(45) Date of Patent: May 15, 2007

(54) DETECTING TEMPORALLY RELATED COMPONENTS OF MULTI-MODAL SIGNALS

(75) Inventors: Paris Smaragdis, Brookline, MA (US); Michael A. Casey, London (GB)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 810 days.

(21) Appl. No.: 10/654,835

(22) Filed: Sep. 4, 2003

(65) Prior Publication Data

US 2005/0053261 A1 Mar. 10, 2005

(51) Int. Cl.
*G06K 9/00* (2006.01)
(52) U.S. Cl. ........................ 382/103; 382/190; 382/191
(58) Field of Classification Search ................ 382/103, 382/125, 149, 151, 184, 190, 191, 287, 294; 381/66, 94.1, 94.2, 71.1, 316, 317, 318
See application file for complete search history.

(56) References Cited

U.S. PATENT DOCUMENTS 5,995,150 A * 11/1999 Hsieh et al. ............ 375/240.12
6,185,309 B1 * 2/2001 Attias ........................ 381/94.1
6,614,428 B1 * 9/2003 Lengyel ...................... 345/420

OTHER PUBLICATIONS

Attias et al., "Blind source separation and deconvolution: the dynamic component analysis algorithm," Neural Computation, 10: 1373-1424, 1998.

Barlow, H.B. (1989) Unsupervised learning. In *Neural Computation* 1 pp. 295 311. MIT Press, Cambridge MA.
Hershey et al., in "*Using audio-visual synchrony to locate sounds,*" Advances in Neural Information Processing Systems 12. MIT Press, Cambridge MA 1999.
Bell, A. J. and Sejnowski, T. J. (1997). The independent components of natural scenes are edge filters. In *Vision Research*, 37 (23) pp. 3327-3338.
Amari S-I., A. Cichocki and H. H. Yang (2000) . A New Learning Algorithm for Blind Signal Separation.
Smaragdis, Paris. (2001) Redundancy Reduction for Computational Audition, a Unifying Approach. *Doctorate Thesis*. Massachusetts Institute of Technology.
Slaney et al., in "*Facesync: A linear operator for measuring synchronization of video facial images and audio tracks,*" Advances in Neural Information Processing Systems 13, MIT Press, Cambridge MA, 2000.
Fisher et al., "*Learning joint statistical models for audio-visual fusion and segregation,*" Advances in Neural Information Processing Systems 13. MIT Press, Cambridge MA, 2001.

(Continued)

*Primary Examiner*—Samir Ahmed
*Assistant Examiner*—Abolfazi Tabatabai
(74) *Attorney, Agent, or Firm*—Dirk Brinkman; Clifton D. Mueller; Gene V. Vinokur

(57) ABSTRACT

A method detects objects in a scene over time. Sets of time-aligned features are extracted from multiple signals representing a scene over time; each signal is acquired using a different modality. Each set of time-aligned features is arranged as a vector in a matrix to which a first transform is applied to produce a compressed matrix. A second transform is applied to the compressed matrix to extract spatio-temporal profiles of objects occurring in the scene.

6 Claims, 3 Drawing Sheets

OTHER PUBLICATIONS

Casey, M., and Westner,W., (2000) Separation of Mixed Audio Sources by Independent Subspace Analysis, in *Proceedings* of the International Computer Music Conference, Berlin Aug. 2000.

Casey, M. (2001) . Reduced-Rank Spectra and Minimum Entropy Priors for Generalized Sound Recognition. In Proceedings of the Workshop on Consistent and Reliable *Cues for Sound Analysis*, EUROSPEECH 2001, Aalborg, Denmark.

Hyv arinen, A. (1999) Survey on independent component analysis. In *Neural Computing Surveys*, 2, pp. 94-128.

M.G. and R.A. Calvo. (1998) Fast dimensionality reduction and simple PCA. In *Intelligent Data Analysis*, 2 (3) .

Roweis, S. (1997) EM Algorithms for PCA and SPCA. In M. I. Jordan,M. Kearns andS. Solla (eds.) , *Neural Information Processing Systems 10*. MIT Press, Cambridge MA.

* cited by examiner

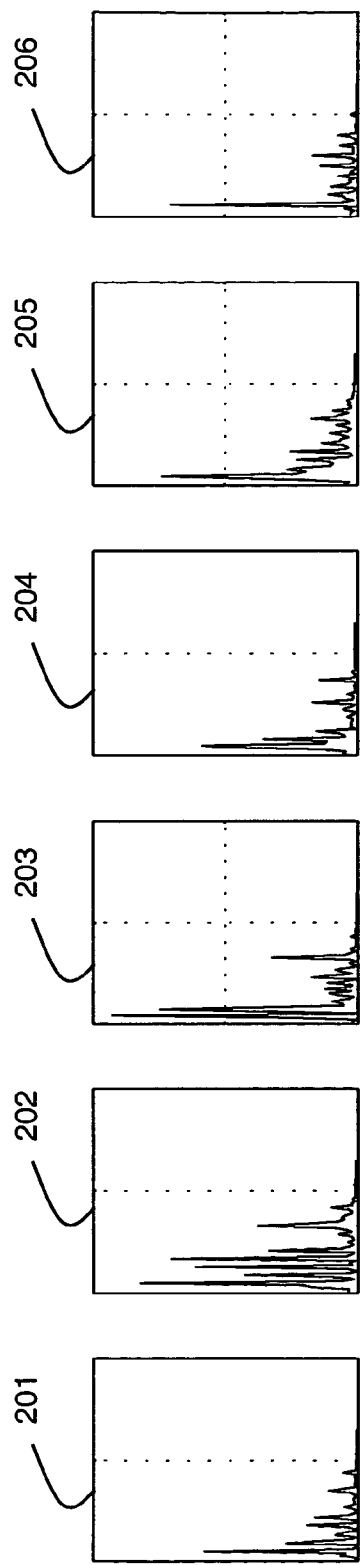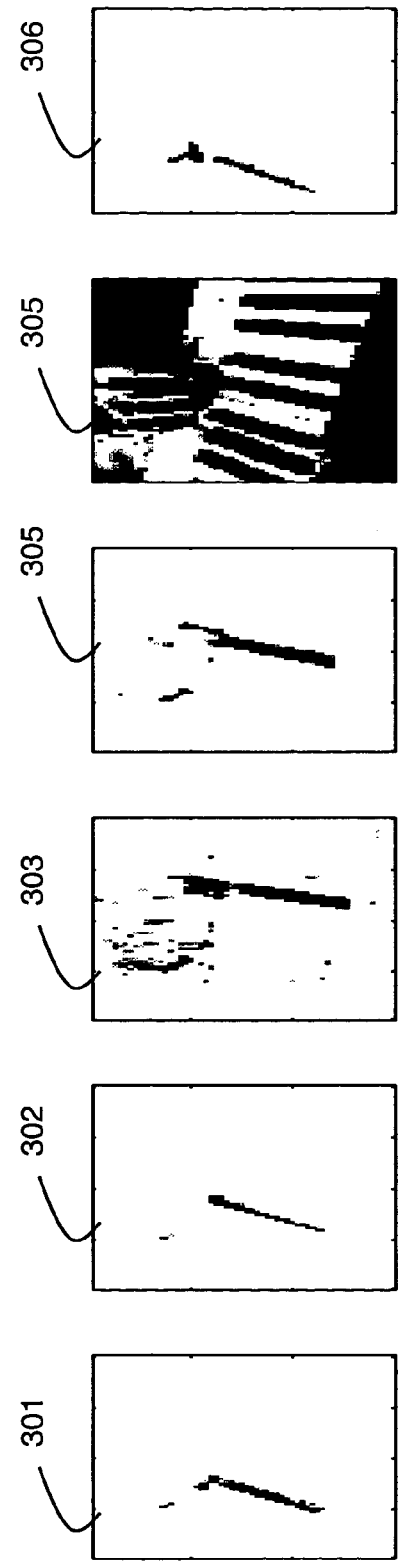
Figure 2
Figure 3

DETECTING TEMPORALLY RELATED COMPONENTS OF MULTI-MODAL SIGNALS

FIELD OF THE INVENTION

The invention relates generally to the field of signal processing and in particular to detecting temporally related components of signals of different input modalities.

BACKGROUND OF THE INVENTION

We perceive the real world by integrating cues from multiple modalities of perception. Our mental representation is not just based on what we see, but also on the sounds we hear, what we smell, as well as other sensory inputs. For example, fireworks are perceived and remembered as bright flashes of lights, soon followed by loud explosions, concussion waves, and the smell of gun powder.

In contrast, conventional computer recognition systems only operate on signals acquired in a single input modality, e.g., either visual signals, or alternatively, audio signals. Patterns recognized separately in different domain are sometimes combined heuristically after processing. That presumes a prior understanding of how different signals are related, see Hershey et al., in "*Using audio-visual synchrony to locate sounds*," Advances in Neural Information Processing Systems 12. MIT Press, Cambridge Mass. 1999, Slaney et al., in "*Facesync: A linear operator for measuring synchronization of video facial images and audio tracks*," Advances in Neural Information Processing Systems 13, MIT Press, Cambridge Mass., 2000, Fisher et al., "*Learning joint statistical models for audio-visual fusion and segregation*," Advances in Neural Information Processing Systems 13. MIT Press, Cambridge Mass., 2001.

It is desired to provide a system and method for detecting events represented by multiple input modes with a single processing method, without a prior understanding of how the events are related.

SUMMARY OF THE INVENTION

The method according to the invention detects objects in a scene over time. Sets of time-aligned features are extracted from multiple signals representing a scene over time. Each signal is acquired using a different modality. Each set of time-aligned features is arranged as a vector in a matrix to which a first transform is applied to produce a compressed matrix. A second transform is applied to the compressed matrix to extract spatio-temporal profiles of objects occurring in the scene.

BRIEF DESCRIPTION OF THE DRAWINGS

FIG. 2 is a block diagram of example audio components according to the invention;

FIG. 3 is a block diagram of example video components related to the audio components of FIG. 2.

DETAILED DESCRIPTION OF THE PREFERRED EMBODIMENT

Figure 1:
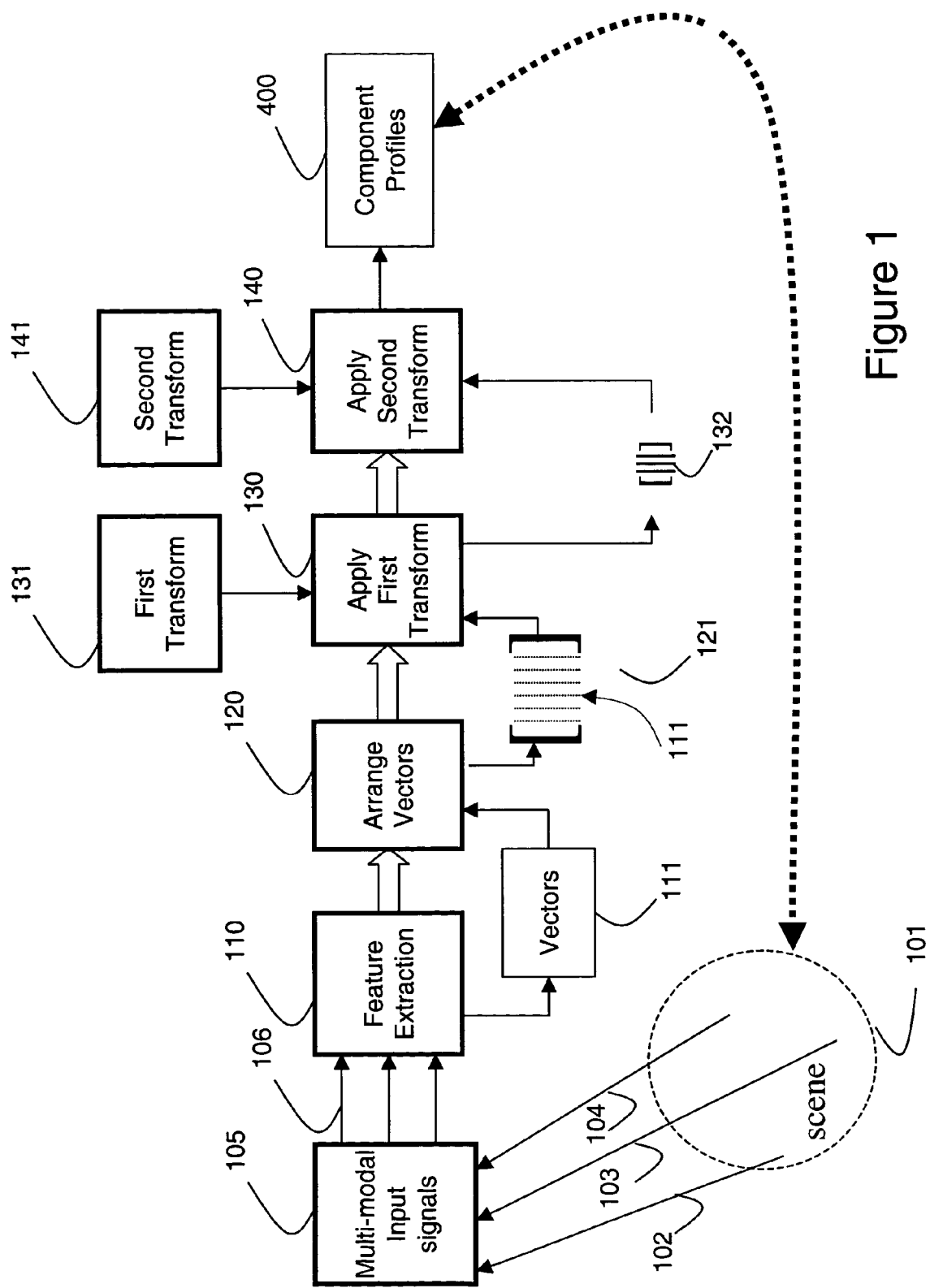
FIG. 1 is a flow diagram of a method for detecting temporally related components of multi-modal signals according to the invention.

FIG. 1 shows a scene 101. Multi-modal signals 102–104 are acquired 105 from the scene as time series. The signals can be audio, visual, infra-red, radar, magnetic, olfactory, tactile, to name but a few. Digital sampling converts the time series to temporal data sequences 106.

Features are extracted 110 from the data sequences using conventional techniques appropriate for the various signaling modalities.

However, in contrast with the prior art where the features are usually processed separately, the invention stacks all of the extracted features, for each time interval, into a single vector. The order of stacking does not matter, as long as it is consistent for all vectors 111. The vectors 111 are arranged 120 as temporally ordered columns in a matrix 121.

A first transform 131 is applied 130 to the matrix 121 to produce a reduced-dimensionality matrix 132. A second transform 141 is applied 140 to the reduced-dimensionality matrix 132 to produce temporally aligned component profiles 400.

Dimensionality Reduction

Dimensionality reduction is performed by principal components analysis (PCA). The PCA is a linear transformation that projects the input to make its variates orthonormal. That is $x_0(t)=W_0 \cdot x(t)$, where $x(t)$ is the input, $x_0(t)$ is the output, and $W_0$ is the linear transformation. The PCA organizes the output in order of variance, so that a first dimension exhibits the greatest variance, and a last dimension the least. In order to reduce dimensionality, only a small number of the higher variance dimensions are retained to produce the matrix 132.

Independence Transform

The second transform 141 uses independent component analysis (ICA). ICA ensures that variates of the input are maximally statistically independent. That is $x_i(t)=W_i \cdot x_r(t)$, where $x_r$ is the input, $x_i(t)$ is the output, and $W_i$ is the linear transformation. A gradient descend method can be used to estimate $W_i$. Upon convergence of the estimated $W_i$, the resulting outputs $x_i(t)$ are the component profiles 400 with minimized mutual information. The elements $x_i(t)$ are the component weights, and the rows of W are the component bases.

If the signals from the different modalities are not perfectly time aligned, then an ICA for convolutive mixtures can be used, see U.S. Pat. No. 6,185,309, "Method and apparatus for blind separation of mixed and convolved sources" issued to Attias on Feb. 6, 2001, and Attias et al., "Blind source separation and deconvolution: the dynamic component analysis algorithm," Neural Computation, 10:1373–1424, 1998. This handles the case where it takes less time for a visual signal to reach a camera co-located with a microphone used to acquire the corresponding audio signal.

This process decomposes high dimensional input to a smaller set of independent time series. If the input contains a mix of highly correlated and redundant time series, the method removes the correlation and the redundancy to expose the component profiles 400 using a compact description.

Example Application

Figure 4:
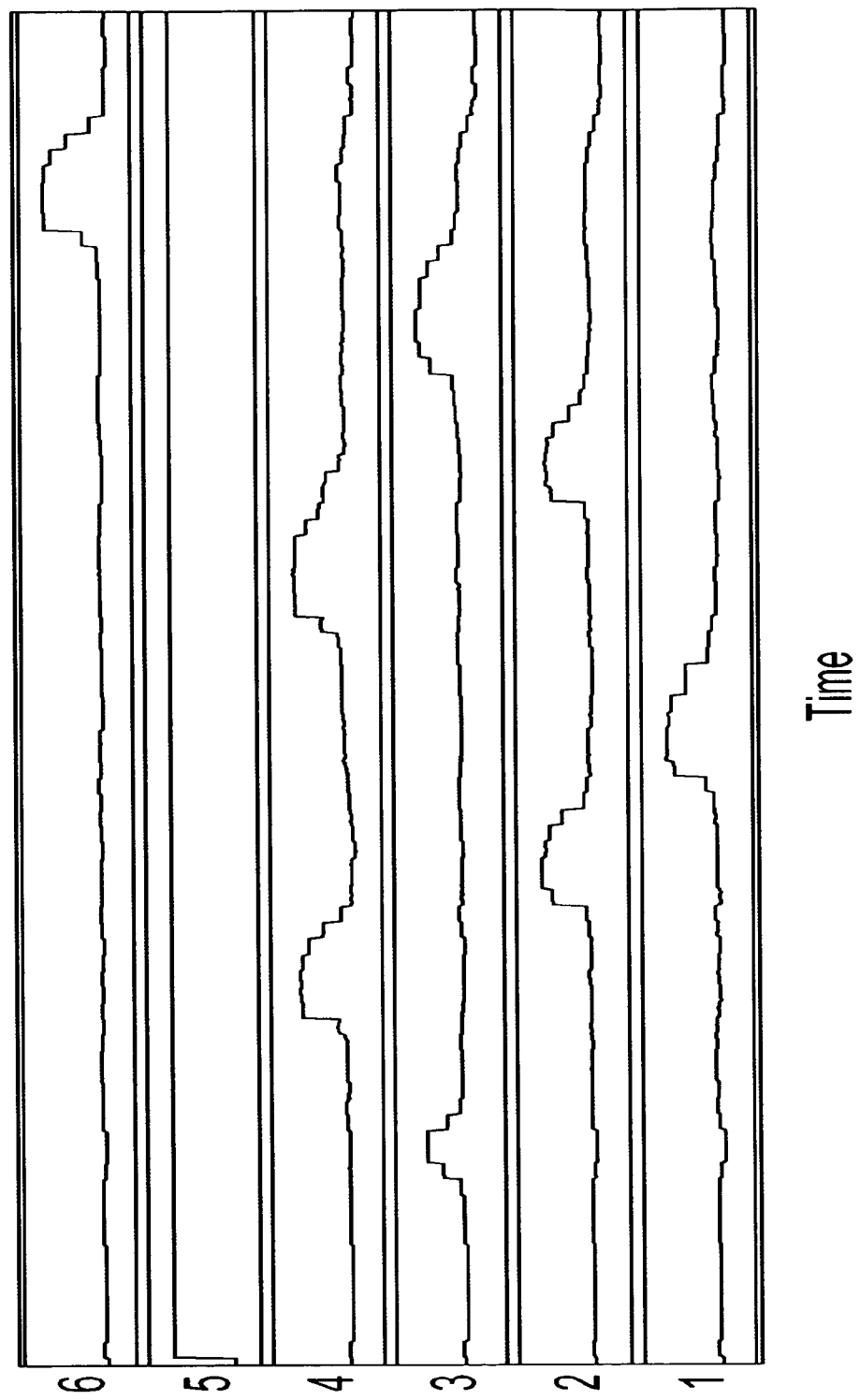
FIG. 4 is a block diagram of component weights as a function of time.

As shown in FIGS. 2–3 for a real world application, an input video is acquired of a scene where a hand is playing notes on a piano keyboard. The visual signal is sampled at 30 fps, and the soundtrack is sampled at 11025 Hz. Appropriate filtering is applied to extract features. FIG. 2 shows six audio segments 201–206 of a component bases $W_a$, and FIG. 3 shows the component bases 301–306 of the corresponding visual segment $W_v$. FIG. 4, shows the weights $x_i(t)$ of the six components 1–6 as a function of time.

Component 5 has a constant weight value and represents the background term of the scene. The remaining component bases are tuned to the notes of individual keys that have been pressed. The notes corresponding to components 1 and 6 are played once, while the notes corresponding to components 2–4 are played twice.

This is evident in FIG. 3 highlighting the keys pressed, and the audio segment in FIG. 2 roughly tuned to the harmonic series of the notes of each key. The component weights offer a temporal transcription of the melody played, providing the correct timing of the performance.

Scene Reconstruction

Using this decomposition is it possible to reconstruct the original scene as is, or in an arbitrary manner. The inverse transform for the above process is $A=W^+$, where the + operator denotes a generalized matrix inverse. The set $x_i(t)$ is a set of maximally independent time series that carry enough information to reconstruct the original matrix $x(t)$, by projecting the time series through the transformation A. The quality of the reconstruction depends on how much larger the original dimensionality is from the reduced dimensionality.

Alternatively, given the highly semantic role of the extracted bases, the component weights can be adjusted to generate a video of a hand playing different melodies on the piano.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for detecting objects in a scene over time, comprising:
   extracting sets of time-aligned features from a plurality of signals representing a scene over time, each signal acquired using a different modality;
   arranging each set of time-aligned features as a vector in a matrix;
   applying a first transform to the matrix to produce a compressed matrix; and
   applying a second transform to the compressed matrix to extract spatio-temporal profiles of objects occurring in the scene.

2. The method of claim 1 in which the first transform uses principal component analysis.

3. The method of claim 1 in which the second transform uses independent component analysis.

4. The method of claim 1 in which each vector is arranged as a temporally ordered column in the matrix.

5. The method of claim 3 in which the independent component analysis is applied to a convolutive mixture of features in each vector.

6. The method of claim 1 in which the plurality of signals includes an audio signal and a video signal.

* * * * *